Aug. 18, 1953     R. H. BLACKFORD     2,649,277
CHECK VALVE
Filed Nov. 25, 1949                      2 Sheets-Sheet 1
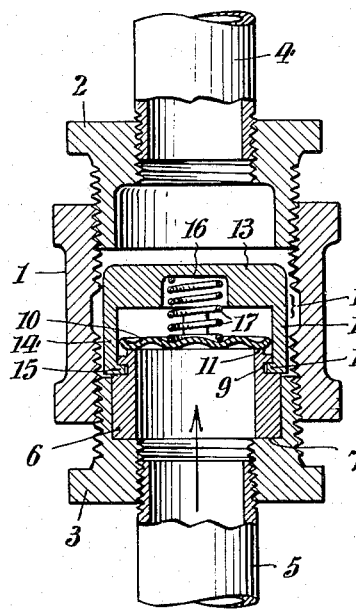
FIG_1_
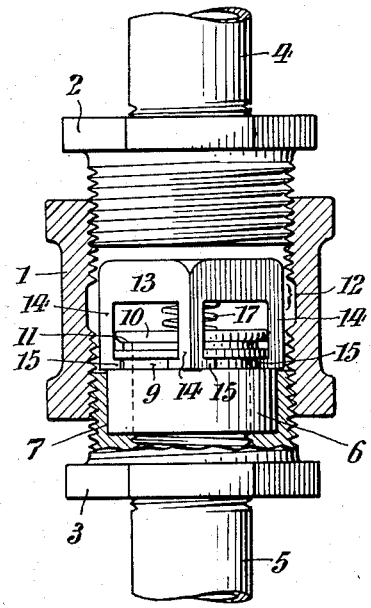
FIG_2_
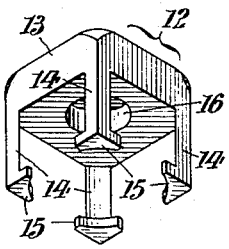
FIG_3_
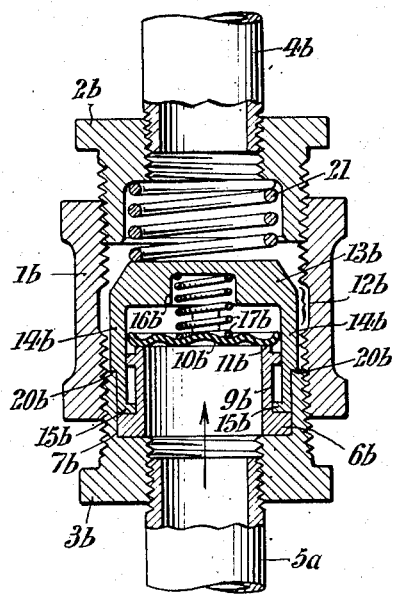
FIG_6_
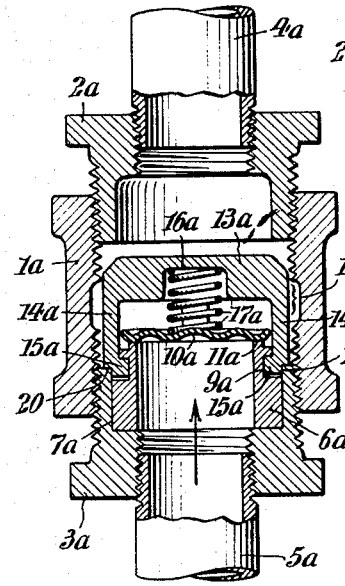
FIG_4_
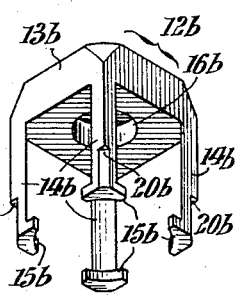
FIG_7_
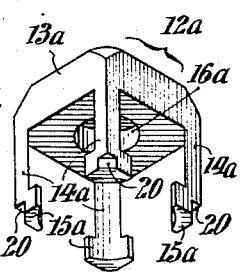
FIG_5_
WITNESSES
Hubert Fuchs
A. J. Brittingham
INVENTOR:
Raymond H. Blackford,
BY Paul & Paul
ATTORNEYS.

Aug. 18, 1953 R. H. BLACKFORD 2,649,277
CHECK VALVE
Filed Nov. 25, 1949 2 Sheets-Sheet 2

WITNESSES
Hubert Fuchs
A. J. Brittingham

INVENTOR:
Raymond H. Blackford.
BY Paul & Paul
ATTORNEYS.

Patented Aug. 18, 1953

2,649,277

UNITED STATES PATENT OFFICE 2,649,277

CHECK VALVE

Raymond H. Blackford, Flushing, N. Y., assignor to Durabla Manufacturing Co., New York, N. Y., a corporation of New York Application November 25, 1949, Serial No. 129,329

1 Claim. (Cl. 251—144)

This invention relates to check valves, that is to say, to valves for restricting flow of fluids to one direction in piping.

Check valves of both the swing and axial lift closure types, as ordinarily made are characterized by having special cast bodies and closure elements which entail the use of rather intricate patterns in fabrication, and which necessitate resort to considerable machining in finishing. Moreover, in order to insure that the force of gravity tends to urge the closures toward their seats with avoidance of binding or sticking, such prior check valves must be installed in the piping with care and in prescribed positions if they are to be relied upon to perform properly and completely obstruct flow through them in the desired direction.

The chief aim of my invention is to avoid the above noted drawbacks of such prior art valves. This objective is attained in practice, as will be more fully disclosed hereinafter, through provision of a simplified check valve for which an ordinary pipe line coupling can be utilized for the body; in which the closure is in the form of a stiffening reinforced metal light stamping free of any connection whatever with the valve seat and urged toward the latter by a spring while constrained to limited axial movement by a cage-like guide and stop; and which can be interposed in either vertical, horizontal or in any angular position in the piping.

Other objects with ancillary advantages will appear from the following detailed description of the attached drawings, wherein—

Fig. 1 is a view in axial section of a check valve conveniently embodying my invention in one form.

Fig. 2 is a view generally like Fig. 1, but with certain of the parts shown in elevation.

Fig. 3 is a perspective view of a guard element used in the valve of Figs. 1 and 2.

Figs. 4 and 5 are views corresponding to Figs. 1 and 3 of a modification of the valve shown in the latter illustrations.

Figs. 6 and 7 are views in turn like Figs. 1 and 3 showing an alternative construction.

Figure 8:
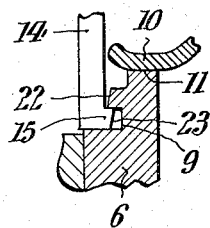
Figs. 8 and 9 are fragmentary detail views in section corresponding to Fig. 1 showing another alternative embodiment of my invention.

With more detailed reference, first more particularly to Figs. 1–3 of these illustrations, the numeral 1 designates a plain ordinary line pipe coupling with screw threads internally of its opposite ends for engagement of reducer bushings 2 and 3 which are axially tapped for connection of pipe sections 4 and 5. In order to make possible the employment of such an ordinary pipe fitting for the purposes of a check valve, I have devised in accordance with my invention, an insert unit including a tubular port and seat member 6 which is force fitted into the annular recess 7 at the inner end of one of the bushings, for example into bushing 3, and which extends somewhat beyond said recess interiorly of the coupling. As shown, the protruding portion of the member 6 is diametrically reduced and provided with a circumferential groove 9. Arranged to cooperate with the member 6 is a closure valve or disk 10 which is struck from stout sheet metal and annularly corrugated so as to be immune against distortion and to bear fully, all around, with the annular edge 11 formed as a consequence of the diametric reduction of the exposed end portion of said member. The closure disk 10 is constrained to axial movement by a guard 12 which as best shown in Fig. 3, has a square head 13 with pendent legs 14. On the ends of legs 14 are formed inwardly extending foot projections 15 adapted to fit snugly into the circumferential groove 9 of the member 6 as shown in Figs. 1 and 2. It will be apparent from Figs. 1 and 2 that each leg 12 is resilient, permitting assembly of the valve by expanding each foot member 15 over the flange on valve member 6 and snapping it into the circumferential groove 9. This locks each foot member against the seat member and thereby fixes the valve guard with respect to the seat member. The head 13 of the guard 12 has a central socket recess 16 arranged to receive one end of a helical compression spring 17. The other end of spring 17 engages within the trough of the innermost corrugation of the closure disk 10 and is thus effectively held against lateral displacement. The guard 12 is in this instance machined from solid bar stock, square in cross section, the diagonal dimension of which corresponds substantially to that of the thread bore of the coupling 1 so as to fit snugly into the latter. Dislodgement of the foot projections 15 on the legs 14 of the guard 12 from the groove 9 of the seat member 6 cannot therefore occur after the valve insert is incorporated within the coupling 1. It is to be noted that the seat bore of the member 6 is substantially equal to that of the pipe sections 4 and 5, and that the spaces between the legs 14 of the guard 12 are sufficiently wide and deep to permit full flow when the closure disk 10 is lifted against the action of spring 17 by fluid pressure in the direction of the arrow, the lift movement of said disk being limited by contact with the confronting face of the head 13 of said guard 12. In fact, the spaces between the legs 14 are much wider than the curved inner faces of the legs 14.

In the modified embodiment of Figs. 4 and 5 the legs 14a of the guard 12a are formed exteriorly of their ends with shoulders 20 for engagement by the annular top edge of the bushing 3a. After assembling of the parts of the insert and forcement of the seat member 6a into the axial recess 7a of the bushing 3a, the foot projections 15a of the guard 12a are clamped between the top edge of the circumferential groove 9a on the seat member 6a and the top edge of said bushing as clearly shown in Fig. 4 and thereby securely held against dislodgment. In all other respects the construction in Fig. 4 is identical with that of Figs. 1 and 2. Accordingly, in order to preclude the necessity for repetitive description, all the other component elements of the modification having their counterparts in the first described embodiment, are identified with the same reference numerals, with addition in each instance, of the letter "a" for convenience of more ready distinction.

In the alternative embodiment of Figs. 6 and 7, the circumferential groove 9b of the seat member 6b is made relatively wide, and the legs 14b of the guard 12b formed externally with shoulders 20b at a higher elevation from the foot ends than in Fig. 5. A further departure from the preceding embodiments to be noted here is that a helical compressing spring 21, stronger than the spring 17b serving the closure disk 10b, is interposed between the guard 12b and the bushing 2b, with one end thereof bearing upon the head of said guard and the other end abutting the annular shoulder of the axial depression in said bushing. Thus in this case, the guard 12 is given the capacity to slide axially relative to the seat member to provide greater flow area in the event of surging of fluid through the valve under abnormally high pressure, the extent of movement allowed the guard under this condition being limited by engagement of the head of said guard with the inner end of the bushing 2b. Otherwise the action of the valve of Fig. 6 is like that of the forms shown in Figs. 1 and 4. All other elements of the valve in Fig. 6 having their counterparts in the previously described embodiments are likewise here identified by the same reference numerals with addition, in each instance, of the letter "b" for the purpose of more ready distinction.

Figure 9:
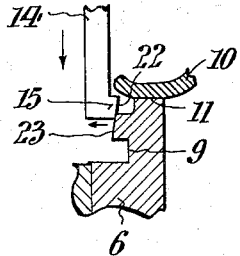

As an alternative, the seat 6 and the feet 15 of the guard may be complementally beveled as at 22 and 23 in Figs. 8 and 9. Accordingly upon pressing the guard downwardly in assembling, the legs 14 will be sprung outwardly as in Fig. 9, and the feet 15 eventually snap into the circumferential groove 9 in the seat member 6 as in Fig. 8.

Figure 10:
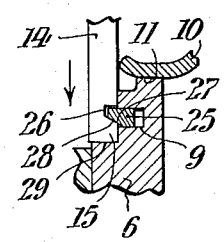
Fig. 10 is a view like Figs. 8 and 9 showing another alternative embodiment.

In the modification of Fig. 10, the guard is removably held in place by means of a split snap ring 25 lodged in the circumferential groove 9 in the seat member 6 to engage notches 26 at the inner sides of the legs 14 adjacent their lower ends. As shown, the snap ring 25 is beveled at the bottom as at 27 for camming action with corresponding bevels 28 at the bottoms of the notches 26 in the legs 14 of the guard. As a consequence, of this construction, the ring 25, in expanding, will enter into the notches 26 with the result that, by the camming action between the bevels 27 and 28, the guard will be urged downward until its legs rest firmly on the horizontal shoulder 29 of the seat member 6. In applying the guard, the ring 25 will of course be compressed and held by means of a suitable tool, so as to lie wholly within the groove 9 of the seat member 6.

Figure 11:
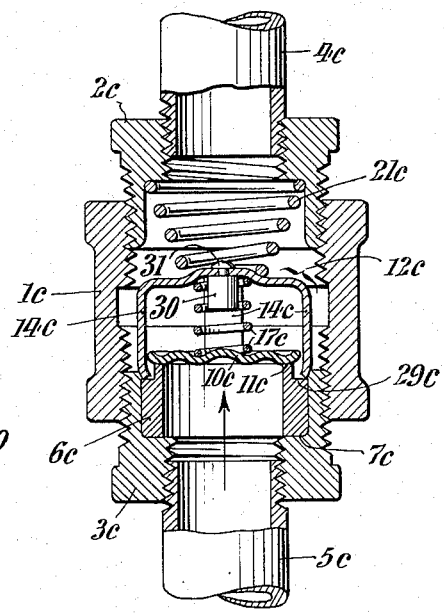
Figs. 11 and 12 are also similar to Figs. 1 and 3 showing a modification of the valve of Fig. 6; and, Fig. 13 is a view showing a blank from which the guard for the valve of Fig. 11 is produced.
Figure 12:
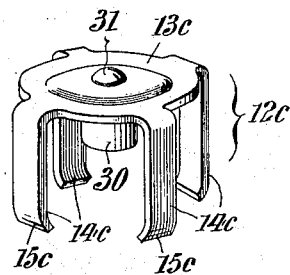
Figure 13:
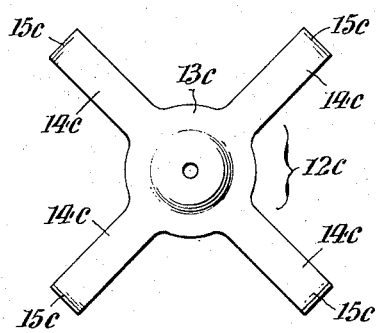

The embodiment illustrated in Figs. 11–13 is in effect a modification of the valve shown in Fig. 6. In this modification, the guard 12c is blanked from stout sheet metal as shown in Fig. 13 with a dished head portion 13c, and with radial projections 14c which are upset at right angles to the head portion as in Fig. 12 to serve as legs and curved inwardly somewhat at their ends as at 15c. The guard 12c is provided with a spring centering stud 30 having a diametrically reduced shank portion which is passed through an axial aperture in the head 13c and peened over as at 31 in Figs. 11 and 12. The seat member 6c is devoid of a peripheral groove, and the legs 14c of the guard 12c simply rest upon the shoulder 29c surrounding the seating edge of said seat member. As in Fig. 6, the guard in Fig. 11 is held in place with capacity for yielding to surging of the fluid traversing the above, by a helicoidal spring 21c which is stronger than the spring 17c acting upon the closure disk. The helicoidal spring 21c is coned in this instance and arranged to react with increasing resistance incident to being compressed. It is to be noted that the curved ends 15c of the legs of the guard 12c underreach the edge of the closure disk 10c slightly to hold the latter and its spring 17c separably assembled with said guard. It is also to be observed here that the lift movement of the disk 10c is limited by the stud 30 of the guard 12c with consequent preclusion of contact and wear between the coils of said spring at any time.

Having thus described my invention, I claim:

In a check valve for a pipe the combination comprising a cylindrical body of larger diameter than said pipe, bushings connecting said cylindrical body to said pipe, one of said bushings having a cylindrical recess therein, a tubular port and seat unit secured to said bushing within said recess and extending axially into said cylindrical body, said port and seat unit having a flat annular end face comprising a valve seat and also having around its outer surface a circumferential groove that is parallel to and spaced from said valve seat, said groove being in a plane generally perpendicular to the axis of said tubular port and seat unit, a valve guard having a flat head in the form of a flat sided polygon extending in a plane substantially perpendicular to the axis of said tubular port and seat unit with a plurality of spaced-apart straight legs extending from the corners of said head substantially parallel to the axis of said tubular port and seat unit, the spaces between said legs being much greater than the widths of said legs to provide a substantial area for fluid flow between said legs, inwardly directed foot members fixed on the ends of said legs and disposed within said circumferential groove to lock the guard in position with the polygonal head spaced from said valve seat, and a valve disc reciprocable between said head and seat, the corners of said polygonal head member and the corners of said leg ends being immediately adjacent to the bore of said cylindrical body, whereby the ends of the legs are restrained against disengagement from said circumferential groove without impeding the substantial area provided for fluid flow between the flat sided polygonal head and the bore of said cylindrical body.

RAYMOND H. BLACKFORD.

References Cited in the file of this patent

UNITED STATES PATENTS

| Number | Name | Date |
|---|---|---|
| 833,559 | Stebbins | Oct. 16, 1906 |
| 1,160,707 | Garber | Nov. 16, 1915 |
| 1,275,697 | Joyce | Aug. 13, 1918 |
| 1,297,930 | Temple | Mar. 18, 1919 |
| 1,959,644 | Richardson | May 22, 1934 |
| 2,038,267 | Bullard | Apr. 21, 1936 |
| 2,216,622 | Miller | Oct. 1, 1940 |
| 2,569,176 | Katcher | Sept. 25, 1951 |

FOREIGN PATENTS

| Number | Country | Date |
|---|---|---|
| 342,774 | Great Britain | of 1931 |
| 673,045 | Germany | of 1939 |